US012644016B2

(12) United States Patent
Abe

(10) Patent No.: US 12,644,016 B2
(45) Date of Patent: Jun. 2, 2026

(54) POLISHING COMPOSITION, POLISHING METHOD AND METHOD FOR PRODUCING SEMICONDUCTOR SUBSTRATE

(71) Applicant: FUJIMI INCORPORATED, Kiyosu (JP)

(72) Inventor: Masashi Abe, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 213 days.

(21) Appl. No.: 18/526,615

(22) Filed: Dec. 1, 2023

(65) Prior Publication Data

US 2024/0182751 A1    Jun. 6, 2024

(30) Foreign Application Priority Data

Dec. 2, 2022    (JP) ................................. 2022-193303
Oct. 20, 2023    (JP) ................................. 2023-180807

(51) Int. Cl.
C09G 1/02    (2006.01)
(52) U.S. Cl.
CPC ...................................... C09G 1/02 (2013.01)
(58) Field of Classification Search
None
See application file for complete search history.

(56) References Cited

U.S. PATENT DOCUMENTS

| | | | |
|---|---|---|---|
| 6,309,560 B1 | 10/2001 | Kaufman et al. | |
| 2020/0071568 A1* | 3/2020 | Kadohashi | .......... H01L 21/3212 |
| 2020/0303198 A1* | 9/2020 | Kadohashi | .......... H01L 21/3212 |
| 2021/0324236 A1* | 10/2021 | Guo | .................. H01L 21/76819 |
| 2022/0055180 A1* | 2/2022 | Chang | ...................... C09K 3/14 |
| 2022/0298380 A1* | 9/2022 | Yoshizaki | ........... H01L 21/3212 |
| 2024/0124744 A1* | 4/2024 | Kim | ........................ C09K 15/20 |
| 2025/0109319 A1* | 4/2025 | Abe | ......................... C09G 1/02 |

FOREIGN PATENT DOCUMENTS

JP          H11-21546 A          1/1999

* cited by examiner

*Primary Examiner* — Shamim Ahmed
(74) *Attorney, Agent, or Firm* — Foley & Lardner LLP

(57)          ABSTRACT

To provide a polishing composition that can polish titanium nitride film at a higher polishing removal rate with respect to the polishing removal rate for silicon oxide film (specifically, a high selection ratio expressed as polishing removal rate for titanium nitride film/polishing removal rate for silicon oxide film) and that has high dispersion stability. A polishing composition containing abrasive grains, an acid, a surfactant, and an oxidizing agent, wherein the abrasive grains have a positive zeta potential, the acid is an inorganic acid, the surfactant contains a compound having a polypropylene glycol structure, the oxidizing agent is hydrogen peroxide, and the pH is 2 or more and 4 or less.

16 Claims, No Drawings

POLISHING COMPOSITION, POLISHING METHOD AND METHOD FOR PRODUCING SEMICONDUCTOR SUBSTRATE

CROSS-REFERENCE

The present application is based on the Japanese patent application No. 2022-193303 filed on Dec. 2, 2022 and the Japanese patent application No. 2023-180807 filed on Oct. 20, 2023, and the disclosed content thereof is incorporated herein by reference in their entirety.

BACKGROUND

Field of the Disclosure

The present invention relates to a polishing composition, a polishing method, and a method for producing a semiconductor substrate.

Description of the Related Art

In recent years, a so-called chemical mechanical polishing (CMP) technique for polishing and flattening a semiconductor substrate in producing a device is used in accordance with multilayer wiring on a surface of a semiconductor substrate. CMP is a method for flattening a surface of an object to be polished (polishing object) such as a semiconductor substrate using a polishing composition (slurry) containing abrasive grains such as silica, alumina, or ceria, an anti-corrosion agent, a surfactant, or the like. The object to be polished (polishing object) a containing is film silicon, polysilicon, silicon oxide, silicon nitride, titanium nitride, titanium, tantalum nitride, tantalum, or the like, a wiring or a plug which consists of metal such as copper or tungsten, or the like.

In particular, focusing on polishing of titanium nitride, JP H11-021546 A discloses that a polishing composition containing an abrasive material, hydrogen peroxide, at least one complexing agent selected from the group consisting of citric acid, lactic acid, tartaric acid, succinic acid, acetic acid, oxalic acid, and salts thereof, and a film forming agent such as benzotriazole (BTA) can polish titanium film and titanium nitride film.

SUMMARY

However, the inventors of the present invention have found that the ratio of the polishing removal rate for titanium nitride film to the polishing removal rate for silicon oxide film is still insufficient when polishing an object to be polished containing titanium nitride film and silicon oxide film using the polishing composition of JP H11-021546 A. Furthermore, the inventors of the present invention have found that the dispersion stability of the polishing composition described in Patent Literature 1 is insufficient.

Accordingly, an object of the present invention is to provide a polishing composition that can polish titanium nitride film at a higher polishing removal rate with respect to the polishing removal rate for silicon oxide film (specifically, a high selection ratio expressed as removal for titanium polishing rate nitride film/polishing removal rate for silicon oxide film) and that has high dispersion stability.

The inventors of the present invention have intensively studied the above problems. As a result, the inventors have discovered that the above problems may be solved by a polishing composition containing abrasive grains, an acid, a surfactant, and an oxidizing agent, wherein the abrasive grains have a positive zeta potential, the acid is an inorganic acid, the surfactant contains a compound having a polypropylene glycol structure, the oxidizing agent is hydrogen peroxide, and the pH is 2 or more and 4 or less, and thus have completed the present invention.

DETAILED DESCRIPTION OF THE PREFERRED EMBODIMENTS

Embodiments of the present invention will be described below, but the present invention is not limited following to only the embodiments and various modifications can be made within the scope of the aspects. The embodiments described in this specification can be optionally combined to make other embodiments. In this specification, unless otherwise specified, operation and measurement of physical properties, etc., are performed under conditions of room temperature (20° C. or higher and 25° C. or lower)/relative humidity of 40% RH or more and 50% RH or less.

The present invention is a polishing composition containing abrasive grains, an acid, a surfactant, and an oxidizing agent, wherein the abrasive grains have a positive zeta potential, the acid is an inorganic acid, the surfactant contains a compound having a polypropylene glycol structure, the oxidizing agent is hydrogen peroxide, and the pH is 2 or more and 4 or less. Such a polishing composition has a high selection ratio, expressed as polishing removal rate for titanium nitride film/polishing removal rate for silicon oxide film (hereinafter, also simply referred to as "selection ratio of titanium nitride/silicon oxide"), and high dispersion stability. The inventors of the present invention presume the mechanism by which such effects can be obtained by the present invention as follows.

The present invention aims to increase the polishing removal rate for titanium nitride film and suppress the polishing removal rate for silicon oxide film. Hydrogen peroxide, an oxidizing agent, is used to increase the polishing removal rate, but if the polishing removal rate for silicon oxide film is increased, the selection ratio of titanium nitride/silicon oxide is reduced. It was also found that if the pH of the polishing composition is less than 2 or more than 4, the polishing removal rate for silicon oxide film is increased and the selection ratio of titanium nitride/silicon oxide is reduced. It is considered that, as for the polishing composition of the present invention, a compound having a polypropylene glycol structure could be selectively adsorbed onto the surface of the silicon oxide film in a specific pH range, forming a protective film for the surface of the silicon oxide film. This is considered to have suppressed the contact between the silicon oxide film and the abrasive grains, which suppresses the polishing removal rate for silicon oxide film, thereby increasing the selection ratio of titanium nitride/silicon oxide. However, the compound having a polypropylene glycol structure interacts with the abrasive grains and additives, which may cause a problem in dispersion stability. As a result of intensive studies on long-term dispersion stability, the inventors of the present invention have found that by combining the compound having a polypropylene glycol structure with an inorganic acid and setting the pH to 2 or more and 4 or less, a polishing composition that can maintain a high selection ratio of titanium nitride/silicon oxide and also exhibit a high dispersion stability can be obtained. For example, when the inorganic acid was replaced by an organic acid in the polishing composition of the present invention, precipitation occurred. This is considered to be because the compound having a polypropylene glycol structure is highly hydrophobic, and therefore may cause hydrophobic interaction with the carbon possessed by the organic acid adsorbed onto the abrasive grain surface, thereby promoting aggregation. It was also found that, when the compound having a polypropylene glycol structure was replaced by a compound having a polyethylene glycol structure in the polishing composition of the present invention, the polishing composition became cloudy and long-term dispersion stability could not be maintained. This is considered to be because polyethylene glycol has higher hydrophilicity compared to polypropylene glycol, and therefore may directly interact with hydrophilic cationic functional groups on the abrasive grain surface, thereby promoting aggregation.

In this way, it is speculated that the compound having a polypropylene glycol structure and the inorganic acid interact well in the polishing composition, thereby maintaining good dispersibility of the abrasive grains and maintaining the dispersion stability of the polishing composition. As described above, the inventors of the present invention have found that a polishing composition containing abrasive grains, an inorganic acid, a compound having a polypropylene glycol structure, and hydrogen peroxide as an oxidizing agent, wherein the pH is 2 or more and 4 or less, may solve the problem of providing a polishing composition that has a high selection ratio of titanium nitride/silicon oxide and high dispersion stability.

Note that the above mechanism is based on speculation, and the present invention is not limited to the above mechanism.

According to the present invention, provided is a polishing composition that can polish titanium nitride film at a higher polishing removal rate with respect to the polishing removal rate for silicon oxide film (specifically, a high selection ratio expressed as polishing removal rate for titanium nitride film/polishing removal rate for silicon oxide film) and that has high dispersion stability.

[Object to be Polished]

Examples of materials contained in the object to be polished that the polishing composition of the present invention polishes include silicon oxide ($SiO_2$), silicon nitride (SiN), Silicon carbon nitride (SiCN), polycrystalline silicon (polysilicon), amorphous silicon, metals, SiGe, and group 13 elements.

Examples of a film containing silicon oxide include a TEOS (Tetraethyl Orthosilicate)-type silicon oxide film (hereinafter, may also be simply referred to as "TEOS" or "TEOS film") that is formed using tetraethyl orthosilicate as a precursor, an HDP (High Density Plasma) film, a USG (Undoped Silicate Glass) film, a PSG (Phosphorus Silicate Glass) film, a BPSG (Boron-Phospho Silicate Glass) film, and an RTO (Rapid Thermal Oxidation) film.

Examples of metal-containing films include tungsten (W) film, titanium nitride (TiN) film, ruthenium (Ru) film, platinum (Pt) film, gold (Au) film, hafnium (Hf) film, cobalt (Co) film, nickel film, (Ni) copper (Cu) film, aluminum (Al) film, and tantalum (Ta) film. From the viewpoint of improving conductivity, W film, TiN film, Ru film, Pt film, or Au film is preferably used, W film or TiN film is particularly preferably used, and W film is most preferably used. In one embodiment, the polishing composition of the present invention can also suitably polish an object to be polished containing metal (for example, tungsten).

The object to be polished according to the present invention may have a layer containing 40 mass % or more of a group 13 element (hereinafter, also simply referred to as a group 13 element layer). Examples of the group 13 element include boron (B), aluminum (Al), gallium (Ga) and indium (In). These group 13 elements may be contained singly or in combinations of two or more thereof.

The group 13 element layer may also contain other elements other than group 13 elements. Examples of other elements include silicon (Si), hydrogen (H), nitrogen (N), oxygen (O), carbon (C), phosphorus (P) and germanium (Ge). These other elements may be contained singly or in combinations of two or more thereof.

The lower limit of a group 13 element contained in the group 13 element layer is 40 mass % or more, preferably 45 mass % or more, and more preferably 50 mass % or more with respect to the total mass of the layer. Further, the upper limit of a group 13 element contained in the group 13 element layer is preferably 100 mass % or less, more preferably 95 mass % or less, and further preferably 90 mass % or less with respect to the total mass of the layer.

The object to be polished according to the present invention preferably contains silicon oxide film or titanium nitride film. Hence, it is preferable that the polishing composition of the present invention is used in applications where an object to be polished containing silicon oxide film or silicon nitride film is polished.

In one embodiment, it is also preferable that the object to be polished according to the present invention contains group 13 elements. Hence, it is preferable that the polishing composition of the present invention is used in applications where an object to be polished containing group 13 elements is polished.

Furthermore, the shape of the object to be polished is not limited. In one embodiment of the present invention, the polishing composition can be preferably applied to polishing of an object to be polished having a planar surface, such as a plate or a polyhedron.

[Abrasive Grains]

The polishing composition according to the present invention contains abrasive grains. The abrasive grains contained in the polishing composition according to the present invention have a positive zeta potential. The abrasive grains are preferably a cation-modified silica (silica having cationic group), and more preferably a cation-modified colloidal silica (colloidal silica having cationic group). The abrasive grains may be used singly or in combinations of two or more thereof. Further, commercial products of the abrasive grains may be used and synthetic products thereof may also be used.

Examples of a method for producing colloidal silica include a soda silicate method and a sol-gel method, and colloidal silica produced by any of these methods is suitably used as abrasive grains according to the present invention. However, from the viewpoint of reducing metal impurities, colloidal silica produced by a sol-gel method is preferable, since such colloidal silica produced by a sol-gel method has a low content of metal impurities diffusible in a semiconductor and corrosive ions such as chloride ions. Production of colloidal silica by such a sol-gel method can be performed by a conventionally known technique. Specifically, hydrolysis and condensation reaction are performed using a hydrolysable silicon compound (for example, alkoxysilane or a derivative thereof) as a raw material, so that colloidal silica can be obtained.

Here, the term "cation-modified" means a state in which a cationic group (for example, an amino group or a quaternary ammonium group) is bound to a surface of silica (preferably colloidal silica). Further, according to a preferred embodiment of the present invention, cation-modified silica particles are amino group-modified silica particles, and more preferably amino group-modified colloidal silica particles. According to such an embodiment, the above effect can be even more improved.

Silica (colloidal silica) is cationically modified by adding a silane coupling agent having a cationic group (for example, an amino group or a quaternary ammonium group) to silica (colloidal silica) for reaction at a predetermined temperature for a predetermined time period. In a preferred embodiment of the present invention, a cation-modified silica is prepared by fixing a silane coupling agent having an amino group or a silane coupling agent having a quaternary ammonium group onto the surface of silica (more preferably colloidal silica).

Examples of a silane coupling agent to be used in such a case include those described in JP 2005-162533 A. Specific examples thereof include silane coupling agents such as N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltriethoxysilane (β-aminopropyl)triethoxysilane), γ-aminopropyltrimethoxysilane, γ-triethoxysilyl-N-(α,γ-dimethylbutylidene)propylamine, N-phenyl-γ-aminopropyltrimethoxysilane, a hydrochloride of N-(vinylbenzyl)-β-aminoethyl-γ-aminopropyltriethoxysilane, octadecyldimethyl-(γ-trimethoxysilylpropyl)-ammonium chloride, and N-trimethoxysilylpropyl-N,N,N-trimethylammonium chloride. Of these, because of good reactivity with colloidal silica, N-(β-aminoethyl)-γ-aminopropyltrimethoxysilane, N-(β-aminoethyl)-γ-aminopropyltriethoxysilane, γ-aminopropyltriethoxysilane, and γ-aminopropyltrimethoxysilane are preferably used. Note that in the present invention, one silane coupling agent may be used, or two or more thereof may be used in combination.

In addition, a silane coupling agent can be directly added to or diluted with a hydrophilic organic solvent or pure water and then added to silica (colloidal silica). Through dilution with a hydrophilic organic solvent or pure water, generation of aggregates can be suppressed. When a silane coupling agent is diluted with a hydrophilic organic solvent or pure water, the silane coupling agent may be diluted with a hydrophilic organic solvent or pure water in such a manner that the concentration of the silane coupling agent is about preferably 0.01 g or more and 1 g or less, and more preferably 0.1 g or more and 0.7 g or less in 1 L of the hydrophilic organic solvent or pure water. Examples of the hydrophilic organic solvent can include, but are not particularly limited to, lower alcohols such as methanol, ethanol, isopropanol, and butanol.

Further, through regulation of the amount of a silane coupling agent added, the amount of a cationic group to be introduced onto the surface of silica (colloidal silica) can be regulated. The amount of a silane coupling agent to be used is not particularly limited and is about preferably 0.1 mM (mmol/L) or more and 5 mM or less, and more preferably 0.5 mM or more and 3 mM or less with respect to the amount of a reaction solution.

Temperatures at which silica (colloidal silica) is cationically modified with a silane coupling agent are not particularly limited and may range from room temperature (e.g., 25° C.) to about the boiling point of a dispersing medium in which silica (colloidal silica) is dispersed. Specifically, the temperature is about 0° C. or higher and 100° C. or lower, and preferably room temperature (e.g., 25° C.) or higher and 90° ° C. or lower.

The lower limit of the zeta potential of the abrasive grains in the polishing composition is preferably 5 mV or more, more preferably 10 mV or more, further preferably 15 mV or more, particularly preferably 20 mV or more, and most preferably 25 mV or more. Further, the upper limit of the zeta potential of the abrasive grains in the polishing composition is preferably 70 mV or less, more preferably 65 mV or less, further preferably 60 mV or less, particularly preferably 55 mV or less, and most preferably 50 mV or less. Specifically, the zeta potential of the abrasive grains in the polishing composition is preferably 5 mV or more and 70 mV or less, more preferably 10 mV or more and 65 mV or less, further preferably 15 mV or more and 60 mV or less, particularly preferably 20 mV or more and 55 mV or less, and most preferably 25 mV or more and 50 mV or less.

With the abrasive grains having a zeta potential as described above, titanium nitride film can be polished at a higher polishing removal rate, and the polishing removal rate for titanium nitride film is higher compared to the polishing removal rate for silicon oxide film (selection ratio of titanium nitride/silicon oxide is more increased). In addition, the dispersion stability of the polishing composition can be even further enhanced.

The shape of abrasive grains is not particularly limited and may be globular or non-globular. Specific examples of a non-globular shape include various shapes, but are not particularly limited to, polygonal columnar shapes such as a triangle pole and a square pole, cylindrical shapes, a straw bag shape in which the center part of the cylinder is swollen more than the end parts, a donut shape in which the center part of the disk is hollow, a plate shape, a so-called cocoon shape having a constriction at the center part, a so-called associated type spherical shape in which a plurality of particles are integrated, a so-called kompeito shape having a plurality of protrusions on the surface; and a rugby ball shape.

The average primary particle size of the abrasive grains is preferably 1 nm or more, more preferably 3 nm or more, and further preferably 5 nm or more. As the average primary particle size of the abrasive grains increases, the polishing removal rate for titanium nitride film is improved. Further, the average primary particle size of the abrasive grains is preferably 100 nm or less, more preferably 50 nm or less, and further preferably 30 nm or less. As the average primary particle size of the abrasive grains decreases, the polishing removal rate for titanium nitride film becomes higher compared to the polishing removal rate for silicon oxide film (selection ratio of titanium nitride/silicon oxide is more increased).

Specifically, the average primary particle size of the abrasive grains is preferably 1 nm or more and 100 nm or less, more preferably 3 nm or more and 50 nm or less, and further preferably 5 nm or more and 30 nm or less. Note that the average primary particle size of the abrasive grains can be calculated on the basis of the specific surface area (SA) of the abrasive grains, as calculated by a BET method, and the density of the abrasive grains, for example. More specifically, as the average primary particle size of the abrasive grains, a value measured by a method described in Examples is employed.

Further, the average secondary particle size of the abrasive grains is preferably 15 nm or more, more preferably 20 nm or more, and further preferably 25 nm or more. As the average secondary particle size of the abrasive grains increases, resistance during polishing decreases to enable stable polishing of titanium nitride film. Further, the average secondary particle size of the abrasive grains is preferably or less, more preferably 150 nm or less, and further preferably 100 nm or less. As the average secondary particle size of the abrasive grains decreases, the surface area per unit mass of the abrasive grains increases, the frequency of contact with an object to be polished is improved, and the polishing removal rate for titanium nitride film is more improved. Specifically, the average secondary particle size of the abrasive grains is preferably 15 nm or more and 200 nm or less, more preferably 20 nm or more and 150 nm or less, and further preferably 25 nm or more and 100 nm or less. Note that the average secondary particle size of the abrasive grains can be measured by a dynamic light scattering method as typified by a laser diffraction/scattering method, for example, and specifically a value measured by a method described in Examples is employed.

The ratio of the average secondary particle size to the average primary particle size of the abrasive grains (average secondary particle size/average primary particle size, hereinafter, also referred to as "average degree of association") is preferably more than 1.0, more preferably 1.1 or more, and further preferably 1.2 or more. As the average degree of association of the abrasive grains increases, the polishing removal rate for titanium nitride film is more improved. Further, the average degree of association of the abrasive grains is preferably 4 or less, more preferably 3.5 or less, and further preferably 3 or less. As the average degree of association of the abrasive grains decreases, the polishing removal rate for titanium nitride film becomes higher compared to the polishing removal rate for silicon oxide film (selection ratio of titanium nitride/silicon oxide is more increased). Specifically, the average degree of association of the abrasive grains is preferably more than 1.0 and 4 or less, more preferably 1.1 or more and 3.5 or less, and further preferably 1.2 or more and 3 or less.

Note that the average degree of association of the abrasive grains is obtained by dividing the value of the average secondary particle size of the abrasive grains by the value of the average primary particle size of the abrasive grains.

The upper limit of the aspect ratio of the abrasive grains in a polishing composition is not particularly limited, but is preferably less than 2.0, more preferably 1.8 or less, and further preferably 1.5 or less. With the upper limit within such ranges, defects on a surface of an object to be polished can be even more reduced. Note that the aspect ratio is an average value of values, each of which is obtained by dividing the length of the long side of a rectangle by the length of the short side of the rectangle, where the rectangle is the minimum rectangle circumscribing each image of the abrasive grains obtained by the use of a scanning electron microscope. The aspect ratio can be found using a general image analysis software. The lower limit of the aspect ratio of the abrasive grains in a polishing composition is not particularly limited, but is preferably 1.0 or more.

The sizes of the abrasive grains (such as average primary particle size, average secondary particle size, and aspect ratio) can be appropriately controlled by selection and the like of a method for producing the abrasive grains.

In this specification, as the zeta potential of the abrasive grains, a value measured by a method described in Examples is employed. The zeta potential of the abrasive grains can be adjusted using the amount of cationic groups contained in the abrasive grains, the pH of the polishing composition, or the like.

In the polishing composition according to the present invention, the abrasive grains may be used singly or in a mixture of two or more thereof. Further, commercial products of the abrasive grains may be used and synthetic products thereof may also be used.

The content (concentration) of the abrasive grains in the polishing composition is not particularly limited, but is preferably 0.1 mass % or more, more preferably 0.2 mass % or more, further preferably 0.5 mass % or more, and particularly preferably more than 0.5 mass % with respect to the total mass of the polishing composition. Further, the upper limit of the content of the abrasive grains in the polishing composition is preferably 10 mass % or less, more preferably 5 mass % or less, further preferably 4 mass % or less, and particularly preferably less than 4 mass % with respect to the total mass of the polishing composition. Specifically, the content of the abrasive grains is preferably 0.1 mass % or more and 10 mass % or less, more preferably 0.2 mass % or more and 5 mass or less, further preferably 0.5 mass % or more and 4 mass % or less, and particularly preferably more than 0.5 mass % and less than 4 mass % with respect to the total mass of the polishing composition. In one embodiment, the content (concentration) of the abrasive grains in the polishing composition is 0.01 mass % or more and 3.0 mass % or less.

With the content of the abrasive grains within such ranges, titanium nitride film can be polished at a higher polishing removal rate, and the polishing removal rate for titanium nitride film is higher compared to the polishing removal rate for silicon oxide film (selection ratio is more increased). In addition, the dispersion stability of the polishing composition is even further enhanced. When the polishing composition contains two or more abrasive grains, the content of the abrasive grains refers to the total amount of these abrasive grains.

When a cation-modified silica is used as the abrasive grains in the polishing composition according to the present invention, the polishing composition may further contain other abrasive grains other than the cation-modified silica to such an extent that the effects of the present invention are not impaired. Such other abrasive grains may be any of inorganic particles, organic particles, and organic and inorganic composite particles. Specific examples of the inorganic particles include particles composed of metal oxide such as untreated silica, alumina, ceria, or titania, silicon nitride particles, silicon carbide particles, and boron nitride particles. Specific examples of the organic particles include methyl polymethacrylate (PMMA) particles.

[Surfactant]

The polishing composition according to the present invention contains a compound having a polypropylene glycol structure (hereinafter, referred to as "polypropylene glycol-based compound") as a surfactant. The polypropylene glycol-based compound has an action of accelerating polishing of (improving the polishing removal rate for) titanium nitride film. One polypropylene glycol-based compound may be used, or two or more thereof may be used in combination. Further, commercial products of the polypropylene glycol-based compound may be used and synthetic products thereof may also be used.

Examples of the polypropylene glycol-based compound include, but are not particularly limited to, polypropylene glycol, polyethylene glycol-polypropylene glycol random copolymer, polypropylene glycol-polytetramethylene glycol random copolymer, polyethylene glycol-polypropylene glycol-polytetramethylene glycol random copolymer, polyethylene glycol-polypropylene glycol block copolymer, polypropylene glycol-polyethylene glycol-polypropylene glycol triblock copolymer, and polyethylene glycol-polypropylene glycol-polyethylene glycol triblock copolymer. Of these, polypropylene glycol is preferable.

The number average molecular weight (Mn) of the polypropylene glycol-based compound is preferably 100 or more, more preferably 150 or more, further preferably 200 or more, particularly preferably 250 or more, and most preferably 300 or more. Further, the weight average molecular weight (Mw) of the polypropylene glycol-based compound may be 2000 or less, for example, and is preferably 1000 or less, more preferably 900 or less, further preferably 800 or less, particularly preferably 700 or less, and most preferably 600 or less. Specifically, the number average molecular weight (Mn) of the polypropylene glycol-based compound is preferably 100 or more and 1000 or less, more preferably 150 or more and 900 or less, further preferably 200 or more and 800 or less, particularly preferably 250 or more and 700 or less, and most preferably 300 or more and 600 or less. In one embodiment, the number average molecular weight (Mn) of the polypropylene glycol-based compound is 200 or more and 1,000 or less.

Note that in this specification, the number average molecular weight (Mn) of the polypropylene glycol-based compound can be measured by gel permeation chromatography (GPC) using polyethylene glycol as a reference material.

[Measurement of Number Average Molecular Weight (Mn) of Polypropylene Glycol-Based Compound]

As the number average molecular weight (Mn) of the polypropylene glycol-based compound, a value of the number average molecular weight (in terms of polyethylene glycol) measured by gel permeation chromatography (GPC) was used. The number average molecular weight was measured by the following apparatus and conditions:

GPC apparatus: manufactured by SHIMADZU CORPORATION

Model: Prominence+ELSD detector (ELSD-LTII)

Column: VP-ODS (manufactured by SHIMADZU CORPORATION)

Mobile phase A: methanol

B: acetic acid 1% aqueous solution

Flow rate: 1 mL/min

Detector: ELSD temp. 40° C., Gain 8, $N_2$ GAS 350 kPa

Oven temperature: 40° C.

Amount injected: 40 μl.

The content (concentration) of the polypropylene glycol-based compound in the polishing composition is not particularly limited, but is preferably 0.001 mass % or more, more preferably 0.005 mass % or more, further preferably 0.01 mass % or more, particularly preferably 0.05 mass % or more, and most preferably 0.07 mass % or more with respect to the total mass of the polishing composition. Further, the content of the polypropylene glycol-based compound in the polishing composition is preferably 10 mass % or less, more preferably 5 mass % or less, further preferably 2 mass % or less, particularly preferably 1 mass % or less, and most preferably 0.8 mass % or less with respect to the total mass of the polishing composition. With the content of the polypropylene glycol-based compound within such ranges, titanium nitride film can be polished at a higher polishing removal rate, and the polishing removal rate for titanium nitride film is higher compared to the polishing removal rate for silicon oxide film (selection ratio of titanium nitride/silicon oxide is more increased). In addition, the dispersion stability of the polishing composition can be even further enhanced.

Specifically, the content (concentration) of the polypropylene glycol-based compound in the polishing composition is preferably 0.001 mass % or more and 10 mass % or less, more preferably 0.005 mass % or more and 5 mass % or less, further preferably 0.01 mass % or more and 2 mass % or less, particularly preferably 0.05 mass % or more and 1 mass % or less, and most preferably 0.07 mass % or more and 0.8 mass % or less with respect to the total mass of the polishing composition.

The polishing composition according to the present invention may contain other surfactants other than the polypropylene glycol-based compound (hereinafter, referred to as "other surfactants"). Other surfactants may be surfactants having at least one functional group selected from cationic group, anionic group, and nonionic group in the molecule. From the viewpoint of reducing aggregates and improving washability, etc., nonionic surfactants can be preferably employed as the above surfactants. The number average molecular weight (Mn) of other surfactants is preferably 100 or more and 1000 or less. Other surfactants may be used singly or in combinations of two or more thereof. When other surfactants are contained in the polishing composition according to the present invention, the mass ratio of the polypropylene glycol-based compound and other surfactants as the surfactant (polypropylene glycol-based compound: other surfactants) is preferably 80:20 to 99.99:0.01, and more preferably 90:10 to 99.9:0.1.

[Acid]

The polishing composition according to the present invention contains an inorganic acid as an acid. The inorganic acid serves as a pH adjusting agent. Examples of the inorganic acid include hydrochloric acid, sulfuric acid, nitric acid, hydrofluoric acid, boric acid, carbonic acid, hypophosphorous acid, phosphorous acid, and phosphoric acid. Of these, hydrochloric acid, sulfuric acid, nitric acid, or phosphoric acid is preferable. One inorganic acid may be used, or two or more thereof may be used in combination. In one embodiment, the inorganic acid includes one or more selected from the group consisting of hydrochloric acid, sulfuric acid, nitric acid, and phosphoric acid. In another one embodiment, the inorganic acid is one or more selected from the group consisting of hydrochloric acid, sulfuric acid, nitric acid, and phosphoric acid.

The content (concentration) of the inorganic acid in the polishing composition is not particularly limited, but is preferably 0.001 mass % or more, and more preferably 0.005 mass % or more with respect to the total mass of the polishing composition. Further, the content of the inorganic acid in the polishing composition is preferably 10 mass % or less, and more preferably 5 mass % or less with respect to the total mass of the polishing composition. With the acid content within such ranges, titanium nitride film can be polished at a higher polishing removal rate, and the polishing removal rate for titanium nitride film is higher compared to the polishing removal rate for silicon oxide film (selection ratio of titanium nitride/silicon oxide is more increased).

In the polishing composition according to the present invention, the inorganic acid serves as a pH adjusting agent for the polishing composition, and therefore, the amount of the inorganic acid added may be adequately adjusted so that the pH of the polishing composition is 2 or more and 4 or less, for example. As an example, when nitric acid is used, the amount of nitric acid added is preferably 0.005 mass % or more and 5 mass % or less, and more preferably 0.01 mass % or more and 3 mass % or less with respect to the total mass of the polishing composition.

[Oxidizing Agent]

The polishing composition according to the present invention contains an oxidizing agent. The oxidizing agent causes oxidation reaction with the surface of an object to be polished during the polishing process, which can reduce the hardness of the surface and make it brittle. By using the oxidizing agent, the polishing removal rate for an object to be polished, such as titanium nitride film, can be effectively improved.

In the polishing composition according to the present invention, the oxidizing agent is hydrogen peroxide. By using hydrogen peroxide, titanium nitride film can be polished at a higher polishing removal rate compared to the polishing removal rate for silicon oxide film, and the dispersion stability of the polishing composition can be enhanced.

Although the polishing composition according to the present invention may contain oxidizing agents other than hydrogen peroxide, it is preferable not to contain oxidizing agents other than hydrogen peroxide in order to more exhibit the effects of the present invention.

It is appropriate to set the content of the oxidizing agent in the polishing composition to 0.001 mol/L (1 mM) or more. From the viewpoint of improving the polishing removal rate for titanium nitride film, in some aspects, as for the content of the oxidizing agent, the above concentration is preferably 0.001 mol/L (1 mM) or more, more preferably 0.005 mol/L (5 mM) or more, further preferably 0.007 mol/L (7 mM) or more, particularly preferably 0.01 mol/L (10 mM) or more, and most preferably 0.02 mol/L (20 mM) or more.

Also, from the viewpoint of dispersion stability of the polishing composition, it is appropriate to set the above content of the oxidizing agent to 10 mol/L (10000 mM) or less, preferably 5 mol/L (5000 mM) or less, more preferably 3 mol/L (3000 mM) or less (such as 2.5 mol/L (2500 mM) or less or 2 mol/L (2000 mM) or less), further preferably 1 mol/L (1000 mM) or less, particularly preferably 0.5 mol/L (500 mM) or less, and most preferably 0.1 mol/L (100 mM) or less.

From the above, it is appropriate to set the content of the oxidizing agent in the polishing composition to 0.001 mol/L or more and 10 mol/L or less, preferably 0.001 mol/L or more and 5 mol/L or less, more preferably 0.005 mol/L or more and 3 mol/L or less, further preferably 0.007 mol/L or more and 1 mol/L or less, particularly preferably 0.01 mol/L or more and 0.5 mol/L or less, and most preferably 0.02 mol/L or more and 0.1 mol/L or less.

[pH]

The pH of the polishing composition of the present invention is 2 or more and 4 or less, preferably 2.0 or more and 4.0 or less, more preferably more than 2 and less than 4, further preferably 2.2 or more and 3.8 or less, and particularly preferably 2.5 or more and 3.5 or less. When the pH is in the above ranges, the desired effects of the present invention are more exhibited.

Note that the pH of the polishing composition can be measured by a method described in Examples, specifically.

The polishing composition of the present invention contains abrasive grains, a polypropylene glycol-based compound, an inorganic acid, and an oxidizing agent as essential components; however, when it is difficult to obtain a desired pH with these components alone, a pH adjusting agent may be added to adjust the pH to such an extent that the effects of the present invention are not impaired.

The pH adjusting agent may be any of alkalis and acids other than the inorganic acids listed above (specifically, organic acids). However, in order to even further exhibit the effects of the present invention, it is preferable that the polishing composition of the present invention does not contain organic acids. One pH adjusting agent can be used, or two or more thereof may be used in a mixture.

Specific examples of organic acids used as the pH adjusting agent include organic acids including carboxylic acids such as formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid, and organic sulfuric acids such as methanesulfonic acid, ethanesulfonic acid, 10-camphorsulfonic acid, and isethionic acid.

Examples of bases that can be used as the pH adjusting agent include hydroxides or salts of group 1 elements, hydroxides or salts of group 2 elements, and quaternary ammonium hydroxides or salts thereof. Examples of salts include carbonate, hydrogen carbonate, sulfate, and acetate.

The amount of the pH adjusting agent added is not particularly limited and may be adequately adjusted so that the polishing composition has a desired pH.

[Dispersing Medium]

The polishing composition according to the present invention preferably contains a dispersing medium for dispersing each component. Examples of the dispersing medium can include water, alcohols such as methanol, ethanol, and ethylene glycol, ketones such as acetone, and mixtures thereof. Of these, water is preferable as the dispersing medium. Specifically, according to a preferred embodiment of the present invention, examples of the dispersing medium include water. According to a more preferred embodiment of the present invention, the dispersing medium is substantially composed of water. Note that the above "substantially" is intended to mean that a dispersing medium other than water can be contained as long as the effects of the present invention can be achieved. More specifically, the dispersing medium is composed of preferably 90 mass % or more and 100 mass % or less of water and 0 mass % or more and 10 mass % or less of a dispersing medium other than water, and more preferably 99 mass % or more and 100 mass % or less of water and 0 mass % or more and 1 mass % or less of a dispersing medium other than water. Most preferably, the dispersing medium is water.

Water containing impurities in an amount as low as possible is preferable as the dispersing medium from the viewpoint of not inhibiting the action of components contained in the polishing composition. Specifically, pure water or ultra-pure water, which is obtained by removing foreign matter through a filter after removal of impurity ions using an ion exchange resin, or distilled water is more preferable.

[Other Components]

The polishing composition according to the present invention may further contain known additives such as a complexing agent, an antiseptic agent, an antifungal agent, a water-soluble polymer, and a dissolution aid, which can be used for the polishing composition, to such an extent that the effects of the present invention are not impaired. The polishing composition according to the present invention is acidic. For this reason, it is more preferable that the polishing compositions contains an antifungal agent. Specifically, in one embodiment of the present invention, the polishing composition is substantially constituted by abrasive grains, a surfactant, a dispersing medium, an inorganic acid, and an oxidizing agent, as well as at least one selected from the group consisting of a pH adjusting agent, a dissolution aid, and an antifungal agent. In one embodiment of the present invention, the polishing composition is substantially constituted by abrasive grains, a surfactant, a dispersing medium, an inorganic acid, and an oxidizing agent, as well as a pH adjusting agent, and at least one of a dissolution aid and an antifungal agent. Here, "the polishing composition is substantially constituted by abrasive grains, a surfactant, a dispersing medium, an inorganic acid, and an oxidizing agent, as well as a pH adjusting agent, and at least one of a dissolution aid and an antifungal agent" is intended to mean that the total content of abrasive grains, a surfactant, a dispersing medium, an inorganic acid, an oxidizing agent, a pH adjusting agent, a dissolution aid, and an antifungal agent is more than 99 mass % (upper limit: 100 mass %) with respect to the polishing composition. Preferably, the polishing composition is constituted by abrasive grains, a surfactant, a dispersing medium, an inorganic acid, an oxidizing agent, a pH adjusting agent, and at least one of a dissolution aid and an antifungal agent (the above total content=100 mass %).

The antifungal agent (antiseptic agent) is not particularly limited, and can be appropriately selected depending on the desired application and purpose. Specific examples thereof include isothiazoline-based antiseptic agents such as 1,2-benzoisothiazol-3(2H)-one (BIT), 2-methyl-4-isothiazolin-3-one, and 5-chloro-2-methyl-4-isothiazolin-3-one, and phenoxyethanol.

The dissolution aid is a substance that is allowed to coexist when dissolving a water-soluble polymer in a dispersing medium (solvent) to improve the solubility of the water-soluble polymer. The polishing composition according to one embodiment of the present invention may further contain a dissolution aid.

Examples of the dissolution aid include alcohol compounds such as methanol, ethanol, 1-propanol, 2-propanol, ethylene glycol, and propylene glycol; ether compounds such as diethylene glycol diethyl ether, 2-methoxyethanol, 2-ethoxyethanol, diethylene glycol, diethylene glycol monomethyl ether, diethylene glycol monoethyl ether, diethylene glycol monobutyl ether, triethylene glycol, triethylene glycol monomethyl ether, tetraethylene glycol, dipropylene glycol, dipropylene glycol monomethyl ether, dipropylene glycol monoethyl ether, tripropylene glycol monomethyl ether, diacetone alcohol, 2-methoxyethyl acetate, 2-ethoxyethyl acetate, and diethylene glycol monoethyl ether acetate; and ketone compounds such as acetone, methyl ethyl ketone, acetylacetone, and cyclohexanone. One dissolution aid can be used, or two or more thereof may be used in a mixture. [Polishing Method and Method for Producing Semiconductor Substrate]

The polishing composition according to the present invention is suitably used for polishing an object to be polished containing titanium nitride and silicon oxide. Hence, the present invention provides a polishing method, which involves polishing an object to be polished using the polishing composition according to the present invention. Further, the present invention provides a method for producing a semiconductor substrate, which involves polishing a semiconductor substrate using the polishing composition according to the present invention. Further, the present invention provides a method for producing a semiconductor substrate, which involves polishing a semiconductor substrate by the polishing method according to the present invention.

As a polishing apparatus, it is possible to use a general polishing apparatus including a holder for holding a substrate or the like having an object to be polished, a motor having a changeable rotational speed or the like fitted thereto, and a platen to which a polishing pad (polishing cloth) can be attached.

As the polishing pad, general nonwoven fabric, polyurethane, a porous fluororesin, or the like can be used without any particular limitation. The polishing pad is preferably grooved such that a polishing liquid can be stored therein.

Regarding polishing conditions, for example, the rotational speed of a platen and a carrier is preferably 10 rpm (0.17 s$^{-1}$) or more and 500 rpm (8.33 s$^{-1}$) or less. The pressure (polishing pressure) applied to a substrate having an object to be polished is preferably 0.5 psi (3.4 kPa) or more and 10 psi (68.9 kPa).

A method for feeding the polishing composition to a polishing pad is also not particularly limited. For example, a method for continuously feeding the polishing composition using a pump or the like is employed. The feed rate is not limited, but a surface of the polishing pad is preferably covered all the time with the polishing composition according to the present invention.

After completion of polishing, the substrate is cleaned in running water, water droplets adhered onto the substrate are removed using a spin dryer or the like for drying, and thus the substrate polished is obtained.

The polishing composition according to the present invention may be of a single-fluid type or multi-fluid type including double-fluid type. Further, the polishing composition according to the present invention may be prepared by, for example, diluting 3 or more times (or 5 or more times, for example) an undiluted solution of the polishing composition using a diluent such as water.

Specifically, the polishing composition according to the present invention may be in the form in which the constitutional components of the polishing composition are prepared and stored separately in two or more multiple slurries and mixed just before polishing or at the time of polishing to form the polishing composition. In this case, a first liquid containing abrasive grains and a surfactant and a second liquid containing an oxidizing agent and an inorganic acid are prepared, and the first liquid and the second liquid are mixed just before polishing or at the time of polishing to form the polishing composition. Here, "at the time of polishing" means the state in which the polishing composition is supplied to an object to be polished, and "just before polishing" means the state up to one hour before the polishing composition is supplied to an object to be polished.

When the first liquid and the second liquid are mixed just before polishing or at the time of polishing to form the polishing composition as described above, examples of the method for mixing the first liquid and the second liquid may include the following methods. For example, it is possible to use a method in which the first liquid and the second liquid are delivered in separate pipes and supplied by merging and mixing these pipes; a method in which the first liquid and the second liquid are mixed in advance just before polishing and supplied; and a method in which the first liquid and the second liquid are separately supplied onto the platen. [Selection Ratio of Titanium Nitride/Silicon Oxide]

The polishing method according to the present invention can polish an object to be polished containing silicon oxide and titanium nitride at a specific polishing removal rate ratio. The polishing method according to the present invention can be preferably applied to polishing (eg, final polishing) of an object to be polished containing silicon oxide and titanium nitride.

The lower limit of the polishing removal rate of titanium nitride is preferably more than 500 Å/min, more preferably 550 Å/min or more, even more preferably 600 Å/min or more, particularly preferably 650 Å/min or more, and most preferably 700 Å/min or more. When the polishing removal rate is more than 500 Å/min, polishing of titanium nitride progresses suitably. The upper limit of the polishing removal rate of the titanium nitride film is not particularly limited, but is practically 8000 Å/min or less. Note that 1 Å=0.1 nm.

The upper limit of the polishing removal rate of silicon oxide is preferably 50 Å/min or less, more preferably less than 50 Å/min, and even more preferably 48 Å/min or less. By setting the polishing removal rate to 50 Å/min or less, the selection ratio of titanium nitride/silicon oxide can be further improved. The lower limit of the polishing removal rate of the silicon oxide film is not particularly limited, but is practically 5 Å/min or more. The selection ratio of titanium nitride/silicon oxide is preferably 10 or more, preferably 12 or more, and more preferably 15 or more.

The embodiments of the present invention are described in detail above, but are given for explanatory and illustrative purposes only, and are not limited. The scope of the present invention should be obviously construed on the basis of the attached aspects.

The present invention encompasses following aspects and embodiments.

1. A polishing composition comprising abrasive grains, an acid, a surfactant, and an oxidizing agent,
   wherein the abrasive grains have a positive zeta potential,
   the acid is an inorganic acid,
   the surfactant a compound having contains a structure, the oxidizing agent is polypropylene glycol hydrogen peroxide, and the pH is 2 or more and 4 or less.
2. The polishing composition according to 1. above, wherein the abrasive grains are a cation-modified silica.
3. The polishing composition according to 1. or 2. above, wherein the surfactant is a polypropylene glycol having a number average molecular weight of 200 or more and 1000 or less.
4. The polishing composition according to any of 1. to 3. above, wherein the inorganic acid is one or more selected from the group consisting of hydrochloric acid, sulfuric acid, nitric acid, and phosphoric acid.
5. The polishing composition according to any of 1. to 4. above, wherein the content of the abrasive grains is 0.01 mass % or more and 3.0 mass % or less with respect to the total mass of the polishing composition.
6. A polishing method, comprising a step of polishing an object to be polished using the polishing composition according to any of 1. to 5. above.
7. A method for producing a semiconductor substrate, comprising a step of polishing a semiconductor substrate by the polishing method according to 6. above.

EXAMPLES

The present invention will be described in more detail using the following Examples and Comparative Examples, but the technical scope of the present invention is not limited to only the following Examples. Note that unless otherwise specified, "%" and "part (s)" refer to "mass %" and "parts by mass", respectively.

<Average Primary Particle Size of Abrasive Grains>

The average primary particle size of abrasive grains was calculated from the specific surface area of silica particles measured by the BET method using "Flow Sorb II 2300" manufactured by Micromeritics and the density of abrasive grains.

<Average Secondary Particle Size of Abrasive Grains>

The average secondary particle size of abrasive grains was measured as volume-mean particle size (arithmetic mean diameter of standard volume; Mv) using a dynamic light scattering particle size·particle size distribution apparatus UPA-UTI151 (manufactured by Nikkiso Co., Ltd.).

<Average Degree of Association of Abrasive Grains>

The average degree of association of abrasive grains was calculated by dividing the value of the average secondary particle size of the abrasive grains by the value of the average primary particle size of the abrasive grains.

<Zeta Potential of Abrasive Grains>

The zeta potential of abrasive grains in the polishing composition was calculated by subjecting a polishing composition to measurement by a laser doppler method (electrophoretic light scattering method) using Zetasizer Nano manufactured by Malvern Panalytical Ltd., under conditions of the measurement temperature of 25° C., and then analyzing the thus obtained data with Smoluchowski's formula.

[Measurement of Number Average Molecular Weight (Mn) of Polypropylene Glycol-Based Compound]

As the number average molecular weight (Mn) of the polypropylene glycol-based compound, a value of the number average molecular weight (in terms of polyethylene glycol) measured by gel permeation chromatography (GPC) was used. The number average molecular weight was measured by the following apparatus and conditions:

GPC apparatus: manufactured by SHIMADZU CORPORATION
Model: Prominence+ELSD detector (ELSD-LTII)
Column: VP-ODS (manufactured by SHIMADZU CORPORATION)

| | |
|---|---|
| GPC apparatus: | manufactured by SHIMADZU COPRORATION |
| Model: | Prominence + ELSD detector (SLSD-LTII) |
| Column: | VP-ODS (manufactured by SHIMADZU COPRORATION) |
| Mobile phase   A: | methanol |
|           B: | acetic acid 1% aqueous solution |
| Flow rate: | 1 mL/min |
| Detector: | ELSD temp. 40° C., Gain 8, $N_2$ GAS 350 kPa |
| Oven temperature: | 40° C. |
| Amount injected: | 40 μl. |

<pH of Polishing Composition>

Regarding the pH of each polishing composition, 3-point calibration was performed using a glass electrode hydrogen ion concentration indicator (manufactured by HORIBA, Ltd., Model No.: F-23) and standard buffers (phthalate pH buffer pH: 4.01 (25° C.), neutral phosphate pH buffer pH: 6.86 (25° C.), carbonate pH buffer pH: 10.01 (25° C.)), and then the glass electrode was placed in the polishing composition, finding thereby the value stabilized after 2 or more minutes as the pH value.

Preparation of Polishing Composition

Example 1

In the manner same as the method described in Example 1 of JP 2005-162533 A, γ-aminopropyltriethoxysilane (APTES) was used as a silane coupling agent at the concentration of 0.113 mmol (0.113 mM) for 1 L of silica sol aqueous dispersion (silica concentration=20 mass %), thereby preparing cocoon-shaped cation-modified colloidal silica having an average primary particle size: 25.0 nm, an average secondary particle size: 50.0 nm, an average degree of association: 2.0, aspect ratio: 1.2.

The above-obtained cation-modified colloidal silica as abrasive grains was added to pure water as a dispersing medium at room temperature (25° C.) so that the final concentration thereof was 0.9 mass %. Furthermore, 2-methyl-4-isothiazolin-3-one (manufactured by THE DOW CHEMICAL COMPANY) was added as an antifungal agent so that the final concentration was 0.014 mM, thereby obtaining a mixed solution.

Thereafter, to mixed solution, a polypropylene glycol (Mw: 400, manufactured by Sanyo Chemical Industries, Ltd.) (denoted as "PPG" in the tables) was added as a surfactant so that the final concentration was 0.1 mass %, nitric acid was added as an inorganic acid so that the pH was 3.0, the mixture was stirred and mixed at room temperature (25° C.) for 30 minutes, and a 31 mass % hydrogen peroxide aqueous solution (manufactured by Santoku Chemical Industries Co., Ltd.) was added as an oxidizing agent to reach the predetermined content (mM) listed in Table 1 and Table 2, thereby preparing a polishing composition. The pH of the obtained mixed solution was measured to be 3.0, and the electrical conductivity was 0.4 mS/cm.

The zeta potential of the cation-modified colloidal silica in the obtained polishing composition was measured according to the above method and the result was +32 mV. Moreover, the particle size of the cation-modified colloidal silica in the polishing composition was the same as the particle size of the cation-modified colloidal silica used.

Examples 2 to 8, Comparative Examples 1 to 12

Except for changing the type and concentration of each component, and the pH as described in Table 1 and Table 2 below, polishing compositions were prepared in the same manner as in Example 1. The composition of each polishing composition is as shown in Table 1 and Table 2 below. When the pH of each polishing composition was measured, the result is as shown in Table 1 and Table 2. Note that the symbol "–" in Table 1 and Table 2 below indicates that the relevant agent was not used. In Table 1, the surfactant "PEG" used in Comparative Example 9 represents a polyethylene glycol.

[Evaluation]

<Evaluation of Dispersion Stability>

The dispersion stability of the polishing composition was evaluated based on the number of coarse particles. Specifically, changes in the number of coarse particles were evaluated immediately after the polishing composition was prepared (0 days), after 1 day of storage at 25° C., and after 3 days of storage at 25° C. The polishing composition was subjected to AccuSizer FX, manufactured by Nihon Entegris G.K., and the number of particles was measured by an optical detection scheme. The number of coarse particles of 0.7 μm or more detected was converted to the number of particles contained per mL and used as the number of coarse particles. The presence or absence of an increase in the number of coarse particles over time was checked, and when there was no tendency for coarse particles to increase, the dispersion stability was considered to be good. It is also practical if the number of coarse particles after 3 days at 25° C. is less than 15,000 particles/mL.

<Evaluation of Polishing Removal Rate of Polishing Composition after Dispersion Stability Test>

After storing each of the above-prepared polishing compositions at 25° C. for 3 days, the polishing compositions were used to polish the surface of objects to be polished under the following conditions. As the objects to be polished, a silicon wafer having titanium nitride (TiN) film with a thickness of 2500 Å formed on the surface (300 mm, blanket wafer) and a silicon wafer having TEOS type silicon oxide ($SiO_2$) film with a thickness of 10000 Å (hereinafter, referred to as "TEOS film") formed on the surface (300 mm, blanket wafer) were prepared.

(Polishing Apparatus and Polishing Conditions)

Polishing apparatus: polishing machine (FREX 300E model) manufactured by Ebara Corporation Polishing pad: manufactured by NITTA Du Pont Incorporated., polyurethane pad IC1000

Polishing pressure: 3.0 psi (1 psi=6894.76 Pa)

Rotational speed of platen: 113 rpm

Feed of polishing composition: flowing

Feed rate of polishing composition: 250 ml/minute

Polishing time: 1 minute (Evaluation of Polishing Removal Rate)

The thickness of the titanium nitride film was measured before and after polishing using a sheet resistance measuring system (VR120/08SD: manufactured by Kokusai Electric Semiconductor Service Inc.) based on the DC four point probe method. The thickness of the TEOS film was measured before and after polishing using an optical film thickness measurement system (ASET-f5x: manufactured by KLA-Tencor Japan Ltd.). With the use of the thus found thicknesses, specifically, each value found by [(thickness before polishing)–(thickness after polishing)] was divided by the polishing time, thereby calculating the polishing removal rate for each object to be polished. For the titanium nitride film, the polishing removal rate of higher than 500 Å/min indicates that the composition tested can be practically used. For the TEOS film, the polishing removal rate of 50 Å/min or lower indicates that the composition tested can be practically used.

The above evaluation results are shown together in Table 1 and Table 2. In Table 1 and Table 2, the titanium nitride film is denoted as "TiN" and the TEOS film is denoted as "$SiO_2$".

TABLE 1

| | Abrasive grains | | Zeta | | | Oxidizing agent | |
| | Type | Concentration [%] | potential [mV] | Acid | pH | Type | Concentration [mM] |
|---|---|---|---|---|---|---|---|
| Comparative Example 1 | Cation-modified colloidal silica | 0.9 | 25 | (+)-10-Camphorsulfonic acid | 3.0 | Hydrogen peroxide | 27 |
| Comparative Example 2 | Cation-modified colloidal silica | 0.9 | 26 | Benzene-sulfonic acid | 3.0 | Hydrogen peroxide | 27 |
| Comparative Example 3 | Cation-modified colloidal silica | 0.9 | 28 | Acetic acid | 3.0 | Hydrogen peroxide | 27 |

TABLE 1-continued

| Comparative Example 4 | Cation-modified colloidal silica | 0.9 | 24 | Citric acid | 3.0 | Hydrogen peroxide | 27 |
|---|---|---|---|---|---|---|---|
| Comparative Example 5 | Cation-modified colloidal silica | 0.9 | 25 | Tartaric acid | 3.0 | Hydrogen peroxide | 27 |
| Comparative Example 6 | Cation-modified colloidal silica | 0.9 | 31 | Nitric acid | 3.0 | — | — |
| Comparative Example 7 | Cation-modified colloidal silica | 0.9 | 30 | Nitric acid | 3.0 | Hydrogen peroxide | 27 |
| Comparative Example 8 | Anion-modified colloidal silica | 0.9 | −40 | Nitric acid | 3.0 | Hydrogen peroxide | 27 |
| Comparative Example 9 | Cation-modified colloidal silica | 0.9 | 28 | Nitric acid | 3.0 | Hydrogen peroxide | 27 |
| Comparative Example 10 | Cation-modified colloidal silica | 0.9 | 29 | Nitric acid | 1.5 | Hydrogen peroxide | 27 |
| Comparative Example 11 | Cation-modified colloidal silica | 0.9 | 33 | Nitric acid | 4.5 | Hydrogen peroxide | 27 |
| Comparative Example 12 | Cation-modified colloidal silica | 0.9 | 27 | Nitric acid | 3.0 | Potassium permanganate | 27 |

| | Surfactant | | | Polishing removal rate [Å/min] | | Polishing removal rate selection ratio TiN/SiO$_2$ | Number of coarse particles of 0.7 μm or more [particles/mL] | | |
| | Type | Number average molecular weight [g/mol] | Concentration [%] | TiN | SiO$_2$ | | After 0 days | After 1 day | After 3 days |
|---|---|---|---|---|---|---|---|---|---|
| Comparative Example 1 | PPG | 400 | 0.1 | 789 | 84 | 9 | 11599 | 21901 | 84920 |
| Comparative Example 2 | PPG | 400 | 0.1 | 673 | 79 | 9 | 9400 | 18539 | 69385 |
| Comparative Example 3 | PPG | 400 | 0.1 | 792 | 88 | 9 | 4292 | 15007 | 44829 |
| Comparative Example 4 | PPG | 400 | 0.1 | 718 | 94 | 8 | 7094 | 20403 | 57388 |
| Comparative Example 5 | PPG | 400 | 0.1 | 733 | 92 | 8 | 7452 | 22851 | 56782 |
| Comparative Example 6 | PPG | 400 | 0.1 | 36 | 44 | 1 | 5830 | 5520 | 5395 |
| Comparative Example 7 | — | — | — | 767 | 117 | 7 | 4222 | 3891 | 4872 |
| Comparative Example 8 | PPG | 400 | 0.1 | 953 | 211 | 5 | 5730 | 6398 | 5295 |
| Comparative Example 9 | PEG | 400 | 0.1 | 732 | 102 | 7 | 7783 | 1572 | 34552 |
| Comparative Example 10 | PPG | 400 | 0.1 | 543 | 232 | 2 | 10761 | 10024 | 9922 |
| Comparative Example 11 | PPG | 400 | 0.1 | 924 | 1942 | 0.5 | 11638 | 11623 | 8869 |
| Comparative Example 12 | PPG | 400 | 0.1 | 384 | 277 | 1 | 7452 | 22851 | 56782 |

TABLE 2

| | Abrasive grains | | Zeta | | | Oxidizing agent | |
| | Type | Concentration [%] | potential [mV] | Acid | pH | Type | Concentration [mM] |
|---|---|---|---|---|---|---|---|
| Example 1 | Cation-modified colloidal silica | 0.9 | 32 | Nitric acid | 3.0 | Hydrogen peroxide | 27 |
| Example 2 | Cation-modified colloidal silica | 0.9 | 31 | Hydrochloric acid | 3.0 | Hydrogen peroxide | 27 |
| Example 3 | Cation-modified colloidal silica | 0.9 | 32 | Phosphoric acid | 3.0 | Hydrogen peroxide | 27 |
| Example 4 | Cation-modified colloidal silica | 0.9 | 33 | Nitric acid | 3.0 | Hydrogen peroxide | 27 |
| Example 5 | Cation-modified colloidal silica | 0.9 | 30 | Nitric acid | 3.0 | Hydrogen peroxide | 27 |
| Example 6 | Cation-modified colloidal silica | 0.9 | 32 | Nitric acid | 3.0 | Hydrogen peroxide | 27 |
| Example 7 | Cation-modified colloidal silica | 0.9 | 33 | Nitric acid | 2.5 | Hydrogen peroxide | 27 |
| Example 8 | Cation-modified colloidal silica | 0.9 | 29 | Nitric acid | 3.5 | Hydrogen peroxide | 27 |

| | Surfactant | | | Polishing removal rate | | Polishing removal rate selection ratio | Number of coarse particles of 0.7 μm or more [particles/mL] | | |
| | Type | Number average molecular weight [g/mol] | Concentration [%] | [Å/min] | | TiN/ | After | After | After |
| | | | | TiN | SiO$_2$ | SiO$_2$ | 0 days | 1 day | 3 days |
|---|---|---|---|---|---|---|---|---|---|
| Example 1 | PPG | 400 | 0.1 | 804 | 42 | 19 | 6344 | 5987 | 4692 |
| Example 2 | PPG | 400 | 0.1 | 792 | 38 | 21 | 6558 | 6147 | 5794 |
| Example 3 | PPG | 400 | 0.1 | 821 | 34 | 24 | 7827 | 8417 | 7675 |
| Example 4 | PPG | 1000 | 0.1 | 754 | 39 | 19 | 8572 | 9842 | 9116 |
| Example 5 | PPG | 2000 | 0.1 | 745 | 49 | 12 | 12163 | 14415 | 12217 |
| Example 6 | PPG | 200 | 0.1 | 811 | 48 | 17 | 6895 | 5064 | 6749 |
| Example 7 | PPG | 400 | 0.1 | 711 | 47 | 15 | 6054 | 6139 | 6019 |
| Example 8 | PPG | 400 | 0.1 | 842 | 44 | 19 | 6954 | 6448 | 5256 |

As is clear from Table 1 and Table 2 above, the polishing compositions of Examples were found to have higher dispersion stability than the polishing compositions of Comparative Examples, as the tendency for coarse particles to increase over time was not observed. In addition, when using the polishing compositions of Examples that had been stored at 25° C. for 3 days, they were found to exhibit a high selection ratio, suppressing the polishing removal rate for the silicon oxide (SiO$_2$) film while polishing the titanium nitride (TiN) film at a high polishing removal rate. On the other hand, the polishing compositions of Comparative Examples showed a tendency for the number of coarse particles to increase over time, and furthermore, when using the polishing compositions of Comparative Examples that had been stored at 25° C. for 3 days, a tendency for the polishing removal rate for the silicon oxide film to increase was observed. Specifically, the polishing compositions of Comparative Examples show a tendency for the number of coarse particles to increase over time and the polishing removal rate for the silicon oxide film to increase accordingly, making them unusable for practical use.

Hence, it can be seen that the polishing composition according to the present invention can polish titanium nitride film at a higher polishing removal rate compared to the polishing removal rate for silicon oxide film, and also has high dispersion stability.

The present application is based on the Japanese patent application No. 2022-193303 filed on Dec. 2, 2022 and the Japanese patent application No. 2023-180807 filed on Oct. 20, 2023, and the disclosed content thereof is incorporated herein by reference in their entirety.

The invention claimed is:

1. A polishing composition for polishing an object to be polished comprising silicon oxide and titanium nitride, the polishing composition comprising abrasive grains, an acid, a surfactant, and an oxidizing agent, wherein:

the abrasive grains have a positive zeta potential, the acid is one or more inorganic acids selected from the group consisting of hydrochloric acid, sulfuric acid, nitric acid, and phosphoric acid, the surfactant consists of a polypropylene glycol having a number average molecular weight (Mn) of 200 or more and less than 2000, the oxidizing agent is hydrogen peroxide and the content of the hydrogen peroxide is 0.01 mol/L or more and 0.1 mol/L or less, a pH of the polishing composition is 2 or more and 4 or less, and a selection ratio of a polishing removal rate of titanium nitride to a polishing removal rate of silicon oxide is 15 or more.

2. The polishing composition according to claim 1, wherein the abrasive grains are a cation-modified silica.

3. The polishing composition according to claim 2, wherein the surfactant is a polypropylene glycol having a number average molecular weight of 200 or more and 1000 or less.

4. The polishing composition according to claim 2, wherein the inorganic acid includes one or more selected from the group consisting of hydrochloric acid, sulfuric acid, nitric acid, and phosphoric acid.

5. The polishing composition according to claim 2, wherein a content of the abrasive grains is 0.01 mass % or more and 3.0 mass % or less with respect to a total mass of the polishing composition.

6. The polishing composition according to claim 1, wherein the surfactant is a polypropylene glycol having a number average molecular weight of 200 or more and 1000 or less.

7. The polishing composition according to claim 1, wherein the inorganic acid comprises nitric acid.

8. The polishing composition according to claim 1, wherein a content of the abrasive grains is 0.01 mass % or more and 3.0 mass % or less with respect to a total mass of the polishing composition.

9. A polishing method, comprising a step of polishing an object to be polished using the polishing composition according to claim 1.

10. A method for producing a semiconductor substrate, comprising a step of polishing a semiconductor substrate by the polishing method according to claim 9.

11. The polishing composition according to claim 1, wherein the pH is more than 2.5 and 3.5 or less.

12. The polishing composition according to claim 1, wherein the number average molecular weight (Mn) of the polypropylene glycol is 250 or more and less than 1000.

13. The polishing composition according to claim 1, wherein the number average molecular weight (Mn) of the polypropylene glycol is 300 or more and 700 or less.

14. The polishing composition according to claim 1, wherein the number average molecular weight (Mn) of the polypropylene glycol is 300 or more and 600 or less.

15. A polishing composition for polishing an object to be polished comprising silicon oxide and titanium nitride, the polishing composition consisting of abrasive grains, an acid, a surfactant, an oxidizing agent, a dispersing medium, and optionally an additive, wherein:

the abrasive grains have a positive zeta potential, the acid is one or more inorganic acid selected from the group consisting of hydrochloric acid, sulfuric acid, nitric acid, and phosphoric acid, the surfactant consists of a polypropylene glycol having a number average molecular weight (Mn) of 200 or more and less than 2000, the oxidizing agent is hydrogen peroxide and a content of the hydrogen peroxide is 0.01 mol/L or more and 0.1 mol/L or less, the additive is one or more selected from the group consisting of a complexing agent, an antiseptic agent, an antifungal agent, a water-soluble polymer, and a dissolution aid, a pH is 2 or more and 4 or less, and a selection ratio of a polishing removal rate of titanium nitride to a polishing removal rate of silicon oxide is 15 or more.

16. A polishing composition for polishing an object to be polished comprising silicon oxide and titanium nitride, the polishing composition comprising abrasive grains, an acid, a surfactant, and an oxidizing agent, wherein:

the polishing composition does not comprise a polyethylene glycol, the abrasive grains have a positive zeta potential, the acid is one or more inorganic acid selected from the group consisting of hydrochloric acid, sulfuric acid, nitric acid, and phosphoric acid, the surfactant contains a polypropylene glycol having a number average molecular weight (Mn) of 200 or more and less than 2000, the oxidizing agent is hydrogen peroxide and a content of the hydrogen peroxide is 0.01 mol/L or more and 0.1 mol/L or less, a pH is 2 or more and 4 or less, and a selection ratio of a polishing removal rate of titanium nitride to a polishing removal rate of silicon oxide is 15 or more.

* * * * *